(12) United States Patent
Kunins et al.

(10) Patent No.: US 8,964,965 B1
(45) Date of Patent: Feb. 24, 2015

(54) SMART CAPTURE

(75) Inventors: Jeffrey Craig Kunins, Seattle, WA (US); Angus MacDonald David, Providence, RI (US); Lisa Stifelman, Palo Alto, CA (US); David Weiden, Portola Valley, CA (US); Adam Elman, San Mateo, CA (US); Sarah Caplener, Santa Cruz, CA (US); Rao S. Surapaneni, San Jose, CA (US); Rajeev Khurana, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1693 days.

(21) Appl. No.: 11/285,394

(22) Filed: Nov. 23, 2005

Related U.S. Application Data

(63) Continuation-in-part of application No. 11/051,939, filed on Feb. 3, 2005, now Pat. No. 8,300,780.

(51) Int. Cl.
*H04M 3/00* (2006.01)
*H04M 3/42* (2006.01)

(52) U.S. Cl.
USPC .................................... 379/355.04; 455/415

(58) Field of Classification Search
CPC ............... H04M 15/06; H04M 1/575; H04M 2203/551; H04M 2250/60; Y10S 707/922; Y10S 707/99933; Y10S 707/99945
USPC ................. 379/88.19–88.28, 142.01–142.07, 379/355.04; 455/415
See application file for complete search history.

(56) References Cited

U.S. PATENT DOCUMENTS

| | | | |
|---|---|---|---|
| 5,604,492 A | 2/1997 | Abdul-Halim | |
| 5,652,789 A | 7/1997 | Miner et al. | |
| 6,021,181 A | 2/2000 | Miner et al. | |
| 6,047,053 A | 4/2000 | Miner et al. | |
| 6,564,264 B1 * | 5/2003 | Creswell et al. | 709/245 |
| 6,687,362 B1 * | 2/2004 | Lindquist et al. | 379/218.01 |
| 6,804,332 B1 | 10/2004 | Miner et al. | |
| 7,068,768 B2 * | 6/2006 | Barnes | 379/142.15 |
| 7,110,529 B2 * | 9/2006 | Kang | 379/355.02 |
| 7,187,932 B1 * | 3/2007 | Barchi | 455/445 |
| 7,189,132 B2 * | 3/2007 | Nacik et al. | 1/1 |

(Continued)

OTHER PUBLICATIONS

Angus MacDonald Davis; U.S. Appl. No. 11/051,939; entitled "Smart Capture for Populating an Address Book With Entries"; filed Feb. 3, 2005; 75 pages.

*Primary Examiner* — Fan Tsang
*Assistant Examiner* — Solomon Bezuayehu
(74) *Attorney, Agent, or Firm* — Steven Spellman; Brian Haslam; Micky Minhas

(57) ABSTRACT

A system for updating a network accessible address book for a user is disclosed. The system includes a network address reference detection agent that detects a network address reference resulting from user interaction with a network addressable device. Network address references include e-mail addresses, SMS addresses, and telephone numbers. After the network address reference detection agent detects an event, a user identity data store is accessed. The user identity data store provides a reverse-lookup of one or more profile elements based upon the network address reference detected by the network address reference detection agent. The system also includes a capture agent for evaluating a business rule based at least on the network address reference. If the business rule is satisfied, the capture agent provides a prompt as to whether the one or more profile elements should be added at least in part to the network accessible address book for the user.

6 Claims, 9 Drawing Sheets

(56) References Cited

U.S. PATENT DOCUMENTS

| | | | |
|---|---|---|---|
| 7,251,313 B1* | 7/2007 | Miller et al. | 379/88.01 |
| 7,304,983 B2 | 12/2007 | Simpson et al. | |
| 7,352,848 B2* | 4/2008 | Stillman et al. | 379/88.03 |
| 7,502,608 B1* | 3/2009 | Goldfinger | 455/412.1 |
| 2002/0151334 A1* | 10/2002 | Sharma | 455/566 |
| 2003/0027602 A1 | 2/2003 | Han et al. | |
| 2003/0028495 A1* | 2/2003 | Pallante | 705/78 |
| 2003/0091173 A1 | 5/2003 | DeSalvo | |
| 2003/0195845 A1 | 10/2003 | Anton et al. | |
| 2004/0133440 A1 | 7/2004 | Carolan et al. | |
| 2004/0266414 A1 | 12/2004 | Likwornik | |
| 2005/0053217 A1* | 3/2005 | Reformato et al. | 379/211.01 |
| 2005/0249344 A1* | 11/2005 | Mueller et al. | 379/207.15 |
| 2006/0002536 A1* | 1/2006 | Ambrose | 379/201.01 |
| 2006/0084414 A1* | 4/2006 | Alberth et al. | 455/414.1 |
| 2006/0093097 A1* | 5/2006 | Chang | 379/88.01 |
| 2006/0128404 A1 | 6/2006 | Klassen et al. | |
| 2006/0246891 A1* | 11/2006 | Rao et al. | 455/426.1 |
| 2007/0226199 A1* | 9/2007 | Moore et al. | 707/3 |
| 2008/0107251 A1* | 5/2008 | Bedingfield et al. | 379/142.01 |
| 2008/0233928 A1* | 9/2008 | Han et al. | 455/414.1 |

\* cited by examiner

SMART CAPTURE

CROSS REFERENCE TO RELATED APPLICATIONS

The present application is a continuation-in-part patent application and claims priority from U.S. patent application Ser. No. 11/051,939, entitled, "SMART CAPTURE FOR POPULATING AN ADDRESS BOOK WITH ENTRIES" filed on Feb. 3, 2005 now U.S. Pat. No. 8,300,780, which is incorporated herein by reference in its entirety.

TECHNICAL FIELD AND BACKGROUND ART

Most individuals own or have access to computing and/or communication devices such as laptop computers, desktop computers, mobile phones, personal digital assistants ("PDAs"), Internet Protocol ("IP") phones, etc. Each of these devices may include software for storing contact information. However, users sometime forget to populate desired new entries into their contact lists or choose not to populate a new entry because it tends to be a cumbersome data entry process.

SUMMARY OF THE INVENTION

A system for updating a network accessible address book for a user is disclosed. The system includes a network address reference detection agent that detects a network address reference resulting from user interaction with a network addressable device. Network address references include e-mail addresses, SMS addresses, and telephone numbers. After the network address reference detection agent detects an event, a user identity data store is accessed. The user identity data store provides a reverse-lookup of one or more profile elements based upon the network address reference detected by the network address reference detection agent. The system also includes a capture agent for evaluating a business rule based at least on the network address reference. If the business rule is satisfied, the capture agent provides a prompt as to whether the one or more profile elements should be added at least in part to the network accessible address book for the user. In one embodiment of the invention, in response to an affirmative response by the user, the capture agent adds at least one or more profile elements to the address book of the user. The capture agent may also add the network address reference to the address book of the user.

In another embodiment, the system includes the network addressable device capable of generating a network address reference upon user interaction with the network addressable device. Examples of network addressable devices include, telephones, cellular phones, computers, SMS messaging systems, and network connected portable digital assistants.

In certain embodiments, the network address reference detector can be located within the network addressable device. In other embodiments, the network address reference detector is located within the network at a remote location from the network addressable device.

The system may include a network history data store that maintains referenced network addresses and associated data along with a parsing agent. The parsing agent parses referenced network addresses from the network history data store that are associated with the user. Examples of a network history data store include billing databases and call logs. In addition, if additional information is found in the network history data store, the user is prompted to see if the user wishes to add this information to the user's address book. The prompting may occur in-band (i.e. during a telephone call) or out-of-band (i.e. after completion of the call). The prompting by either the capture or parsing agent may occur over a different channel. For example, the original network address reference event may be a telephone call, while the prompting may occur using e-mail or an SMS message. The system may further prompt the user to inquire whether the user wishes to change the business rules. The system may prompt to change the business rules based upon the network address or the profile elements located in the history data store or the user identity data store.

BRIEF DESCRIPTION OF THE DRAWINGS

The foregoing features of the invention will be more readily understood by reference to the following detailed description, taken with reference to the accompanying drawings, in which:

FIG. 4 shows a control flow for the real-time capture of a network event;

FIG. 5 shows the control flow that occurs when a call is received by a user that has a contact list that resides on the network;

FIG. 6 shows the control flow when a user dials a directory assistance number;

FIG. 7 shows a control flow when a capture agent mines for profile elements even if a network event does not occur;

FIG. 8 shows the control flow when the system needs to perform a reverse look-up; and FIG. 9 shows the control flow when the business rules require prompting of the user.

DETAILED DESCRIPTION OF SPECIFIC EMBODIMENTS

The exemplary embodiments of the present invention are directed at novel systems and methods for populating entries into contact information software and/or capturing profile elements. More specifically, the exemplary embodiments provide for an automatic and smart manner of capturing profile elements. Throughout this description, the term "profile element" refers to the data relating to an entity. Typical profile elements include one or more of a name, an address, a phone number, an email address, a web page address, etc. However, those of skill in the art will understand that these are only exemplary and there may any number of other identifying types of information that a user may wish to store for a particular contact in a contact list. The term "user" as used herein may refer to a person, a business or a group.

Figure 1:
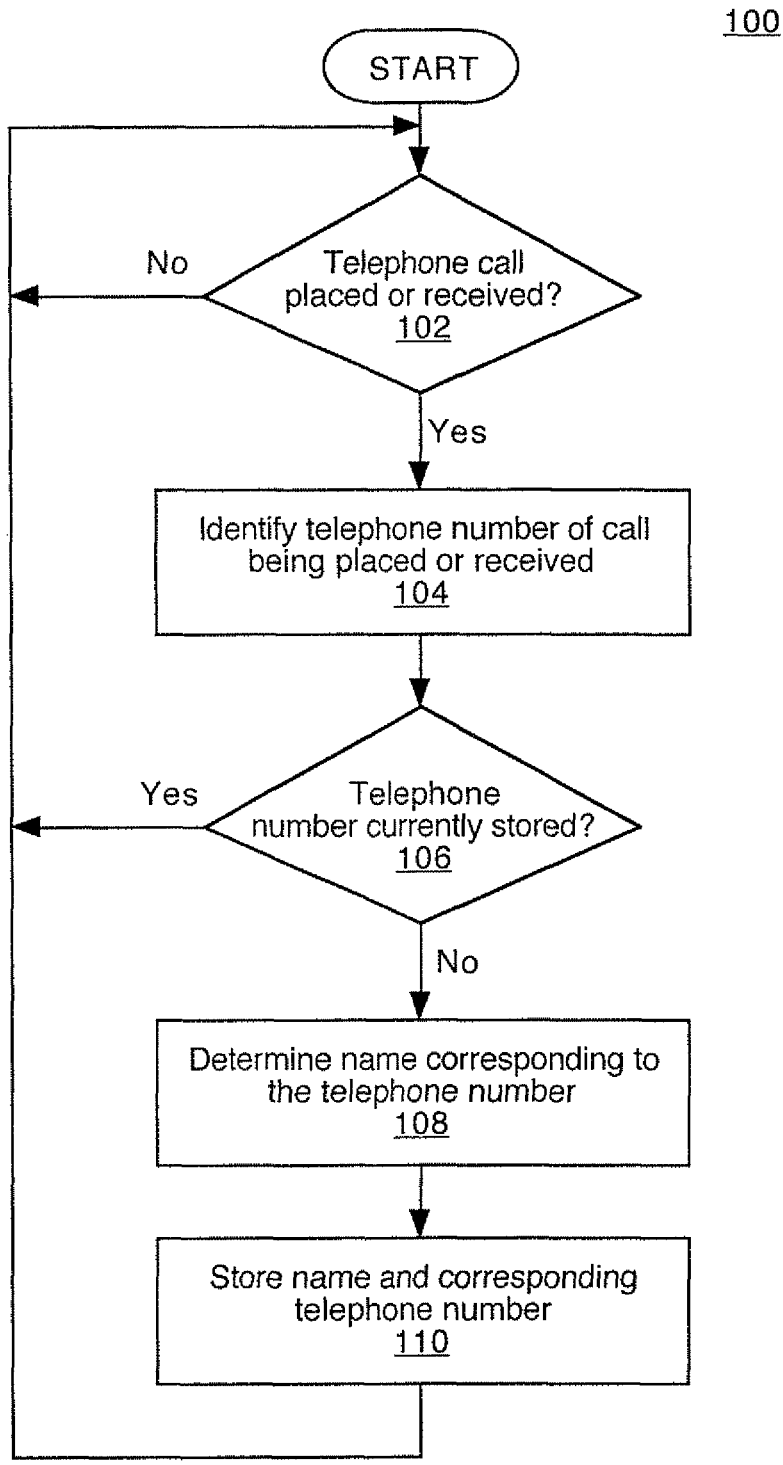
FIG. 1 shows an exemplary method of gathering profile elements during an exemplary network address reference event.

FIG. 1 shows an exemplary method for gathering a profile element during an exemplary network address reference event. As will be described in greater detail below, a network address reference event refers to any action that a user may take within a network from which a network address may be extracted. A network address may be considered any identifier that identifies a particular user on a network. Examples of network addresses may include a phone number, an email address, a universal resource locator ("URL"), universal resource identifier ("URI"), Instant Messaging identifier, IP address, etc. The network address itself may be considered a profile element, which may be desired to be stored by the user. In addition, the exemplary embodiments of the present invention may use this extracted network address to gather additional profile elements relating to the entity associated with the network address for the purpose of populating these additional profile elements into a user database.

In step 105, a network address event is detected, e.g., dialing a telephone number, sending an electronic mail, accessing a web page, etc. As seen from these exemplary events, each event generates a network address, e.g., a phone number, an email address, SMS address, a web address, etc. Those of skill in the art will understand that the detection of each of these events may require different types of detection functionality within the various networks where these events occur. Several examples of this detection functionality will be provided below. For example, a Java application could be installed on a wireless phone that runs in resident memory and traps/reacts to all outbound and inbound calls and SMS message events. In a telephone network, there could be an SS7 device configured to intercept and observe all SS7 traffic going across all or part of a network, such as an i-Net device. The device may be configured to ignore all traffic except for call setups between certain users. Other NAR detection agents may be built into directory assistance (411) software or within a voice activated dialing application. In such embodiments, the detector is built into the call flow logic of the system in the system's prompting module. Another NAR detection agent may be an out-of-band/asynchronous detector that monitors billing and call log records.

One or more business rules are evaluated based upon the network address in step 107. Additionally, one or more network modules may be used for detecting network address events and evaluating business rules. The network modules may be electronic hardware, software or a combination of the two and the modules may reside at different locations within a network or on the device originating the network address event.

In one example, the network module that detected the network event may compare the network address to network addresses from previous network events for the user to see if the network address should be added to the address book. For example, the network module accesses a network accessible address book for the user. The network module searches the network accessible address book to see if the detected network address is present. If it is not present, the business rule is satisfied and the method continues to step 110. If it is present, the module continues to listen for network events. Another example of a business rule may include determining whether the same network address has been accessed a set number of times before accessing step 110. For example, the network module may include a counter and keeps track of the number of times that a network address had been accessed by a given user. If the number of times that the network address reaches a threshold, only then would step 110 be reached. If the network address has not yet reached, the threshold the network module continues to listen for network events.

In step 110, the user is prompted to determine if the user is interested in collecting and storing profile elements based on the detected network address event. If the user does not want to store any profile elements related to this detected network address event, the method 100 will loop back and the network module will continue to listen for a network event. If the user decides to store profile elements based on the detected network address event, the process will continue to step 115 where the additional profile elements will be detected. These additional profile elements will be detected based on the original network address. For example, if the original network address is a phone number, a reverse look-up database may be accessed to extract additional information such as the name and/or address associated with the phone number. Again, as in step 105, the detection of additional profile elements may vary based on the detected original network address. Thus, different network addresses may include different functionality. For example, if an e-mail address is detected, a data store is accessed and based upon the e-mail address, information such as the name, address, and telephone number of the user associated with the e-mail address may be obtained.

In step 120, additional prompts may be provided to the user to select which profile elements the user desires to store. For example, the user may desire to store all or some of the profile elements that are detected for the network address. In step 125, the detected profile elements are stored. As described above, the method 100 is a general method for detecting and storing profile elements. Each of the individual steps in this method may require functionality for the type of network address (e.g., phone number, email address, etc.) and the type of device (e.g., phone, computer, PDA, etc.). Examples of these various types of functionality will be provided below. Each of the method steps may occur solely on the device used by the user producing the network address event or the steps may be distributed at one or more modules in the network. Thus, the functionality may be distributed.

In addition, the various steps of the method 100 may be rearranged. For example, the initial prompting of the user (step 110) may occur after the additional profile elements are detected (step 115). Moreover, the detection of step 105 and the remaining portion of the method may occur within the time frame of the detection of the network address reference event or the remaining steps may occur at some time after the detection event. For example, the network address event may occur and be stored in a history store and at a subsequent time point, the history store may be accessed and the contents of the history store evaluated to see if the contents meet the business rules for a given user. In such an embodiment, the network accessible address book is not updated in real-time.

Figure 2:
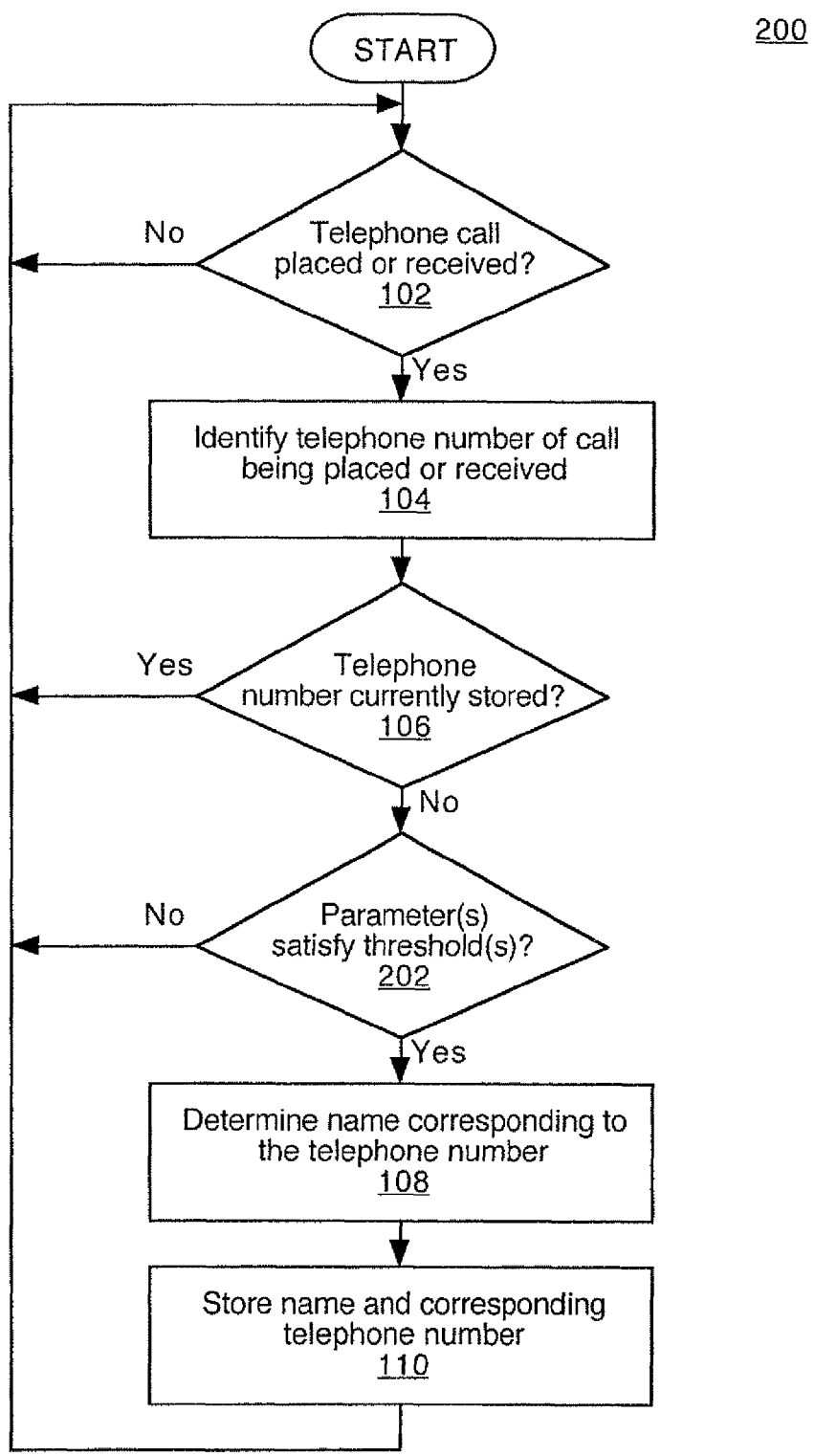
FIG. 2 shows an exemplary system for populating profile elements derived by users of the system according to the present invention.

FIG. 2 shows a block diagram of an exemplary system 1 for populating contact information derived by user's interaction with the system. The system 1 is shown with a first computing device 12 and a telephone 14 for a first user 10. The computing device 12 and the telephone 14 are shown as being connected to a network 30. For example, the computing device 12 may have an Internet connection and the telephone 14 may be an IP phone. Thus, in this example, the network 30 may be the public internet. However, those of skill in the art will understand that the network 30 may include any type of network, including, but not limited to the Public Switched Telephone Network ("PSTN"), a public or private LAN or WAN network, a mobile phone network, etc. In addition, it is not necessary that both devices 12 and 14 be connected to the same network. The system 1 also includes a second computing device 22 and a second telephone 24 which are also connected to the network 30 for use by a second user 20.

The system 1 further shows a contact list 40, which will contain the entries with contact information. A contact list is sometimes referred to using different terminology based on the particular type of hardware/software, which implements the contact list. For example, a contact list may also be referred to as an address book, saved phone number listing, etc. In the context of the present invention, any method for storing contact information may be considered a contact list. In certain embodiments, a contact list can be a shared contact list shared by a plurality of users or all users. For example, a family contact list where all members of the family have access to the contact list or a carrier's 911 or 411 contact list.

The contact list 40 is shown as also being connected to the network 30. Those of skill in the art will understand that the contact list 40 may be stored on a separate physical device 45 as shown, which is connected to the network 30 to which users 10 and 20 have access. In an alternative embodiment, a contact list may be stored locally on the actual user device. For example, the computing device 12 may have a stored contact list for the user 10. The present invention is not limited to any particular type of contact list. As shown in FIG. 2, the contact list 40 may be considered a network contact list, which stores contact information for a plurality of users (e.g., users 10 and 20). In a network contact list, each user 10 and 20 may have an individual contact list and/or the contact list 40 may be a single contact list for all authorized users. The contact list is stored in associated memory and has an associated storage format. For example, the contact list may be a relational database or stored as variables for objects in an object-oriented environment. The database may be any database type having a database structure known to those of ordinary skill in the art.

The users 10 and 20 in the ordinary course of using their respective devices 12, 14, 22 and 24 will generate network address references. A network address may be considered any identifier that identifies a particular user on a network. Examples of network addresses may include a phone number, an email address, a universal resource locator ("URL"), universal resource identifier ("URI"), Instant Messaging identifier, IP address, etc. Thus, a network address reference is a user's interaction with a device that references the address. For example, when a user types an email address of an intended recipient, the user is creating a network address reference. A network address reference ("NAR") event is any event or action generating a network address reference. As will be described in greater detail below, an NAR event may be used to trigger the capture function of the exemplary embodiments of the present invention.

As shown in FIG. 2, the user 10 has performed an action on telephone 14, which generated an NAR event 18. For example, the user 10 may have placed a call to another person. In this example, the network address reference may be the phone number of the person to whom the call is placed. The system 1 also includes an NAR detection agent 50, which will detect the occurrence of an NAR event (e.g., NAR event 18). In the exemplary system 1, the NAR detection agent 50 is shown as a process running on a separate device 55 connected to the network 30. In this example, the NAR detection agent 50 (or a series of detection agents) may include functionality which monitors all devices (e.g., devices 12, 14, 22 and 24) connected to the network 30 to detect NAR events. Thus, when the user 10 places the phone call from telephone 14, the NAR detection agent 50 connected to the network 30 will detect the occurrence of NAR event 18.

In an alternative embodiment, the NAR detection agent 50 may be a process running on an individual device to detect when an NAR event is generated by the device (or is incoming to the device). In the above example, the telephone 14 may include an NAR detection agent, which monitors the actions of the telephone 14 and detects the occurrence of the NAR event 18. As described above, the NAR detection agent may detect NAR events that are generated by the device (e.g., the outgoing telephone call) or are incoming to the device. One example of an incoming event is the receipt of a telephone call by a telephone 14. The network address reference may be the ANI of the phone from which the call is incoming. Thus, the NAR event is the receipt of the incoming phone call and the NAR detection agent detects this NAR event.

The NAR detection agent 50 upon detecting the NAR event 18 will collect certain information about the NAR event 18 that will allow other modules to process the information of the NAR event 18. The processing of the NAR event 18 may occur in real time during the NAR event 18 or it may occur at some later time after the NAR event 18 has been generated. The type of information that is collected by the NAR detection agent 50 may vary based on the type of NAR event that is detected.

For example, in the case of the NAR event 18, the NAR detection agent 50 may collect the number that has been dialed by the telephone 14 and identification information for the telephone 14. The identification information may be, for example, the number of the telephone 14, the type of device, etc. This identification information may be used by additional processing modules to determine the type of processing to be performed for the NAR event. For example, phone calls may be processed in a different manner than an email or a URL request. In addition, different users may set up different rules for capturing contact information from the NAR events. Different users may use the same device (telephone, computer etc.) and may populate their individual contact lists. In this embodiment of the invention, a user login occurs preceding use of the device. For example, user 20 may use phone 14. When the phone is taken off-hook, the user is prompted by a prompting agent 80, to provide an identifier of the user. The user can enter an identifying number by using the buttons on the telephone or may speak the user's name wherein the identifying agent would include voice recognition software (e.g. speech-to-text). After the number is entered or the speech has been translated to text, the identifying agent locates the user's contact list. The user would then enter information (telephone number, e-mail address); this NAR event is sensed by the NARD. The NARD may either be local to the phone or computer or the NARD may be located remote from the phone or computer in electronic communication with the telephone or computer at a network node. The NARD module provides notice to the capture and prompting module 55.

The capture and prompting module includes one or more defined business rules. The NAR is used at least in part to evaluate the business rules. For example, if user 10 uses telephone 14 to call telephone 24, this NAR event is sensed by the NARD and the NARD passes information regarding the event to the capture and prompting module. The capture and prompting module evaluates the NAR event in relation to the stored business rules. For example, the business rule may indicate that a user will not be prompted to add user information if the telephone number has not been called at least three times. Applying this business rule, and assuming that the capture and prompting module includes a record indicating that the telephone number has been accessed three times, the capture and prompting agent will access a user identity data store 60. The capture and prompting agent will cause a search to be conducted using the network address reference. The user identity data store is a storage location that contains searchable records. For example, the name, home street address, business address, e-mail address, and alternative telephone numbers may be obtained by searching the user identity data store 60. It should be understood that there may be more than one user identity data store in the network and that each user identity data store may contain different information and different relationships of information. For example, one user identity data store may have a look-up for names based upon e-mail addresses, whereas a second user identity data store may contain information allowing for searching based on a user's name and allowing for access to the user's address and alternative telephone numbers. The capture and prompting module 55; would know the different varieties of user identity data stores that are present on the network and would be able to provide the proper inputs for searching the data stores. Thus, using the example, given an e-mail address, the capture and prompting module would first access the user's name and then would use this retrieved information to search a second user identity data store to obtain address information and alternative telephone numbers. In other embodiments, there may be different business rules for different situations. For example, there may be business rules that are applicable during a telephone call transaction, while other business rules that are used by the capture agent to access data when there is no NAR event. There may be other business rules that are applicable to e-mail events. For example, all e-mail transactions by the capture and prompting agent may occur "out-of-bounds" (not during the initial exchange) wherein the capture and prompting agent issues a batch request on a weekly basis. In another embodiment, the business rules may cause a feedback loop.

The capture and prompting agent 55 will then send a query to the network device from which the network address event was generated. The query will ask the user whether the user wishes to store user information that is associated with the user's telephone number. This query could be presented using a speech-processing unit that would audibly inquire and allow the user to respond employing speech recognition technology. In other embodiments, the user 10 may use computer 12 and may send an e-mail message to an e-mail address or send an SMS message using a cellular phone. Assuming that the business rule has been evaluating affirmatively and user information has been located for the e-mail address in a user identity data store 60, the capture and prompting agent will inquire as to whether user information should be added to the user's contact list. In such an embodiment, the query may be audible using a speech-processing engine or the query may be a text message sent to the user's computer 12. The query may ask the user whether information should be added to the contact list and subsequently the type of information that should be added based upon the user information that was retrieved from the user identity data store. For example, the user may be prompted whether different types of retrieved information should be added, address, e-mail address, SMS address, photo, other personal information etc.

In certain embodiments, history store 80 is included. This network module stores network addresses reference events. The history store 80 can be accessed by another network module, a parsing agent 85. The parsing agent accesses the history store at a time after the NAR and employs the business rules evaluating the data in the history store employing business rules. The business rules may be the same or different from the business rules used by the capture and prompting module 55. Thus, the parsing module can work in non-real time (non-contemporaneously with the NAR event) to populate one or more user's address books.

It should be made clear that each agent/module that is presented in FIG. 2 may be one of a plurality of such modules found within the network. Each user may be associated with a separate set of modules or the modules may be shared in total or in part amongst a plurality of users. When the capture and prompting agent contacts the user inquiring whether information should be added to the user's contact list, the capture and prompting agent may ask further questions regarding modifying the business rules. For example, if the information being added to the contact list is for an employee of company Z, the capture and prompting agent would inquiry whether other information concerning other employees of company Z should be added to the contact list without further prompting.

Figure 3:
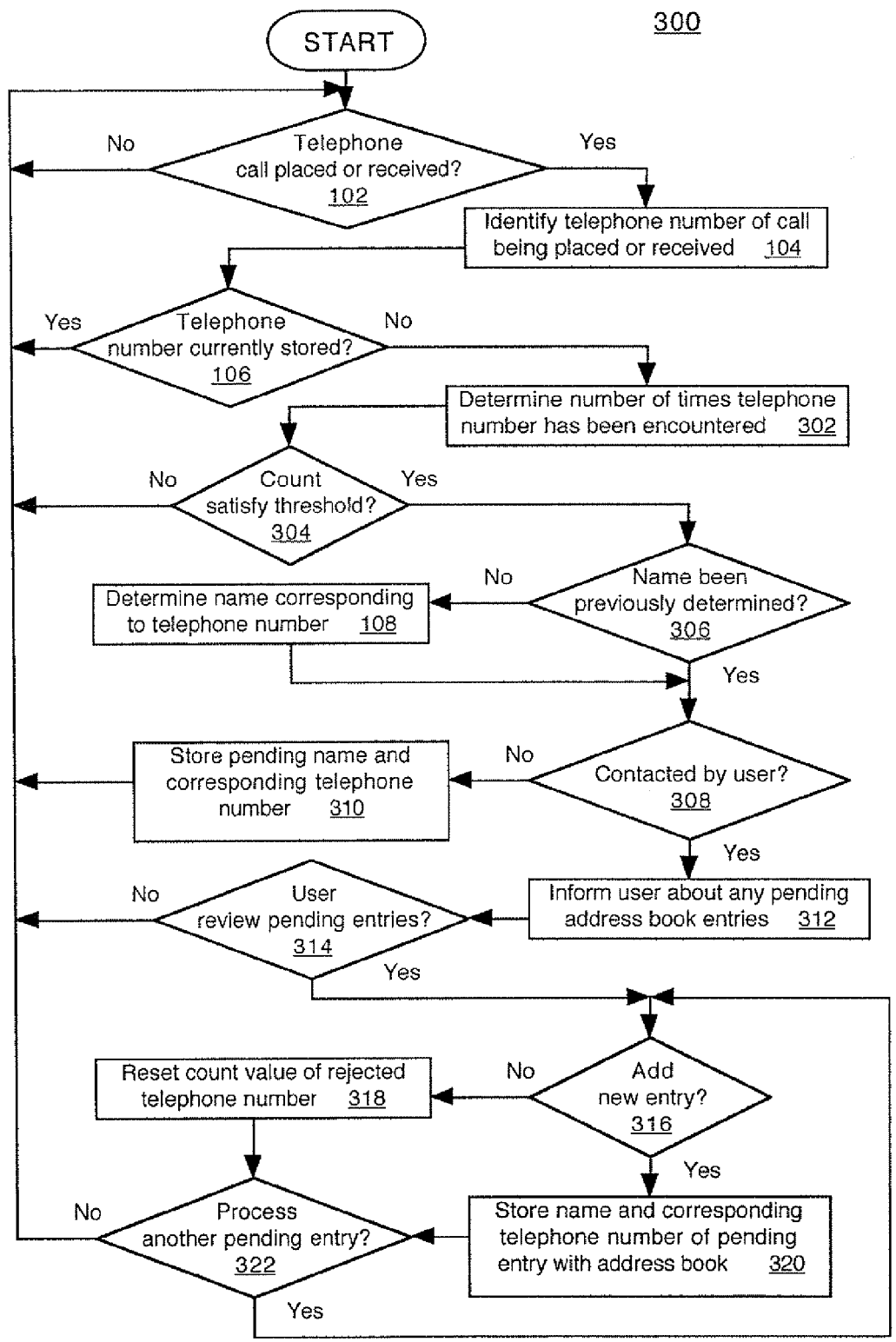
FIG. 3 shows an exemplary network architecture for gathering profile elements.

A network architecture 300 for implementing the system is shown in FIG. 3. In such an architecture 300, a user places or receives a telephone call from either the PSTN (public switched telephone network) or a VOIP (voice over internet protocol) network. If the user initiates a call from a PSTN phone 301, the PSTN call is forwarded to a class 5 switch 311. If the user initiates a call from a VOIP phone 302, the VOIP phone transfers the VOIP call to a softswitch that mimics a Class 5 PSTN switch 312. In a preferred embodiment, the softswitch (312, 311) or Class 5 switch are configured to send signaling (SIP or SS7) to a feature server 305. If the call originates in the PSTN network, the class 5 switch 311 sends the call to a VOIP gateway 303 and the VOIP gateway 303 converts the voice signal into IP packets. The VOIP gateway 303 and the VOIP phone 302 use SIP (session initiation protocol) to establish a session with a feature server 305. The VOIP gateway 303 or the VOIP phone 302 sends a SIP initiation request to the feature server 305. The feature server 305 receives at least the IP address of the VOIP gateway 303 or the VOIP phone 302 during this transaction. The feature server 305 responds back to the VOIP gateway 303 or VOIP phone 302 and establishes the session. During this process, the signaling is detected at the feature 305 server by an NAR detection agent 306. The NAR detection agent 306 listens for DTMF (dual tone multi-frequency) triggers and termination triggers, which are NARs. DTMF triggers occur when a user dials a telephone number. Call termination triggers occur when another party dials a user. When either trigger occurs, the NAR detection agent 306 communicates with a web server 340 and transfers the NAR event information using HTTP to a capture agent 355A on the web server 340. In other embodiments, the NAR detection agent 306 may reside at the switch i.e. the softswitch 312 or the PSTN class 5 switch 311.

The web server includes a capture agent, a prompting agent, and a business rules database. As provided in FIG. 3, the capture and prompting agent is separated into two modules, a capture agent 355A and a prompting agent 355B. The capture agent 355A accesses the business rules database 310 and the database storing contact lists and evaluates one or more business rules. The capture agent 355A accesses the user's contact list that made the call based upon information in the NAR event. The capture agent 355A also consults various user identity stores 315 for determining the identity of called party. For example, the capture agent 355A may consult a caller ID database 320, a CNAM (caller name) database 321, shared directories 322 or a directory assistance database 323 to find the name associated with the NAR. The capture agent 355A could consult a caller ID database 320, perform a reverse look-up, and obtain the name of the party being called.

Once the capture agent 355A identifies the called party, the capture agent 355A may then access other databases using the called party's name to acquire other information required in evaluating the business rules. Examples of how the business rules are evaluated will be provided below.

If the capture agent 355A evaluates the business rule(s) and determines that the user needs to be prompted prior to capturing and populating the user's contact list, the capture agent 355A accesses the prompt agent 355B and the prompt agent causes the feature server 305 to initiate a session with an IVR (interactive voice recognition) server 307. The feature server 305 initiates the session using SIP (session initiation protocol). The IVR server 307 obtains the IP address of either the VOIP gateway 303 or the VOIP telephone 302 from the feature server 305 during the SIP communications. The prompting agent 355A provides the IVR server 307 with the textual prompts that the IVR server 307 converts the prompts into a voice signal using a text-to-speech (TTS) application or an equivalent application known to those of ordinary skill in the art. For example, the TTS application could be simple TTS or a more sophisticated audio application using VoiceXML that is dynamically assembled. The IVR server 307 transfers the voice prompts to the VOIP gateway 303 or directly to the VOIP phone 302 using RTP (the real-time protocol).

The prompting agent 355B may issue a request asking the user whether the user wishes to add contact information to the user's contact list for the party being called. If the user affirmatively responds, the prompting agent 355B may further ask the user if the user wishes to store additional information about the party being called. For example, the prompting agent may prompt the user to speak any information that the user knows about the party being called, such as, the called party's address, alternative phone numbers, nickname etc. The prompting agent 355B would then contact the capture agent 355A and the capture agent 355A would populate the user's contact list 330 with the information. The prompting agent 355B may also inquire as to whether the system should attempt to gather addition information for populating the entry in the user's contact list 330 associated with the party being called. If the user affirmatively responds, the prompting agent 355B contacts the capture agent 355A and the capture agent accesses various databases including the Caller ID database 320, the CNAM database 321, a shared directories database 322, and a directory assistance database 323. The prompting agent may prompt the user when information about the called party is located to see if the user wants that information added. For example, if an additional telephone number is located for the called party, the prompting agent 355B may prompt the user as to whether this alternative phone number should be added.

For each call that is detected by the one or more NAR detection agents, the web server 340 will record the event and store the information in a Network Address Reference store (NAR store) 335 that relates the dialed telephone number with the user. An example of a NAR store is a billing database as used by telephone companies. When subsequent NAR events occur related to the user making the telephone call, the capture agent can then access the NAR store and use the stored information in the evaluation of the business rules and for population of a user's contact list.

FIGS. 4-9 show control flows between the different elements of the system when various network events occur. In these examples, the dialing of a telephone number or receiving a telephone call is the network event. This is done for exemplary purposes only and is not intended to limit the scope of the disclosed inventions to telephone networks and telephone calls. Other network events could be substituted for the dialing/receiving of a telephone call, such as, the sending/receiving of an e-mail message or sending/receiving of an SMS message.

Figure 4:
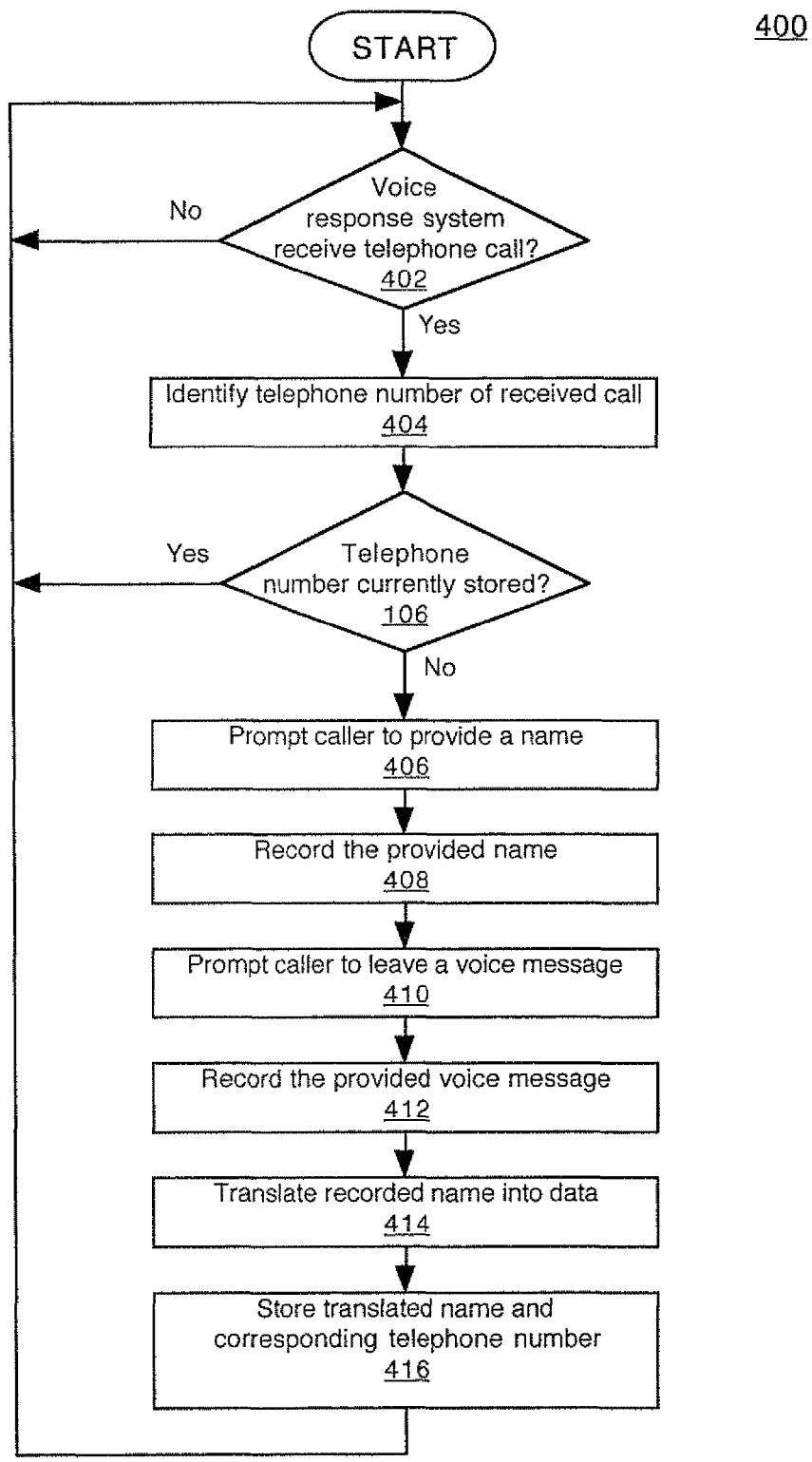
FIGS. 4-9 show control flows between the different elements of the system when various network events occur.

FIG. 4 shows a control flow for the real-time capture of a number that is dialed. In this sequence, there are no business rules. A user dials a number on a telephone 400. The NAR detection agent 410 detects the dialed event and sends information gathered by the NAR detection agent 410 to the capture agent 420. The information obtained by the NAR detection agent 410 includes the dialed telephone number and the telephone number of the party dialing. The capture agent 420 identifies the contact list for the party dialing and stores the telephone number of the dialed party in the contact list 430.

Figure 5:
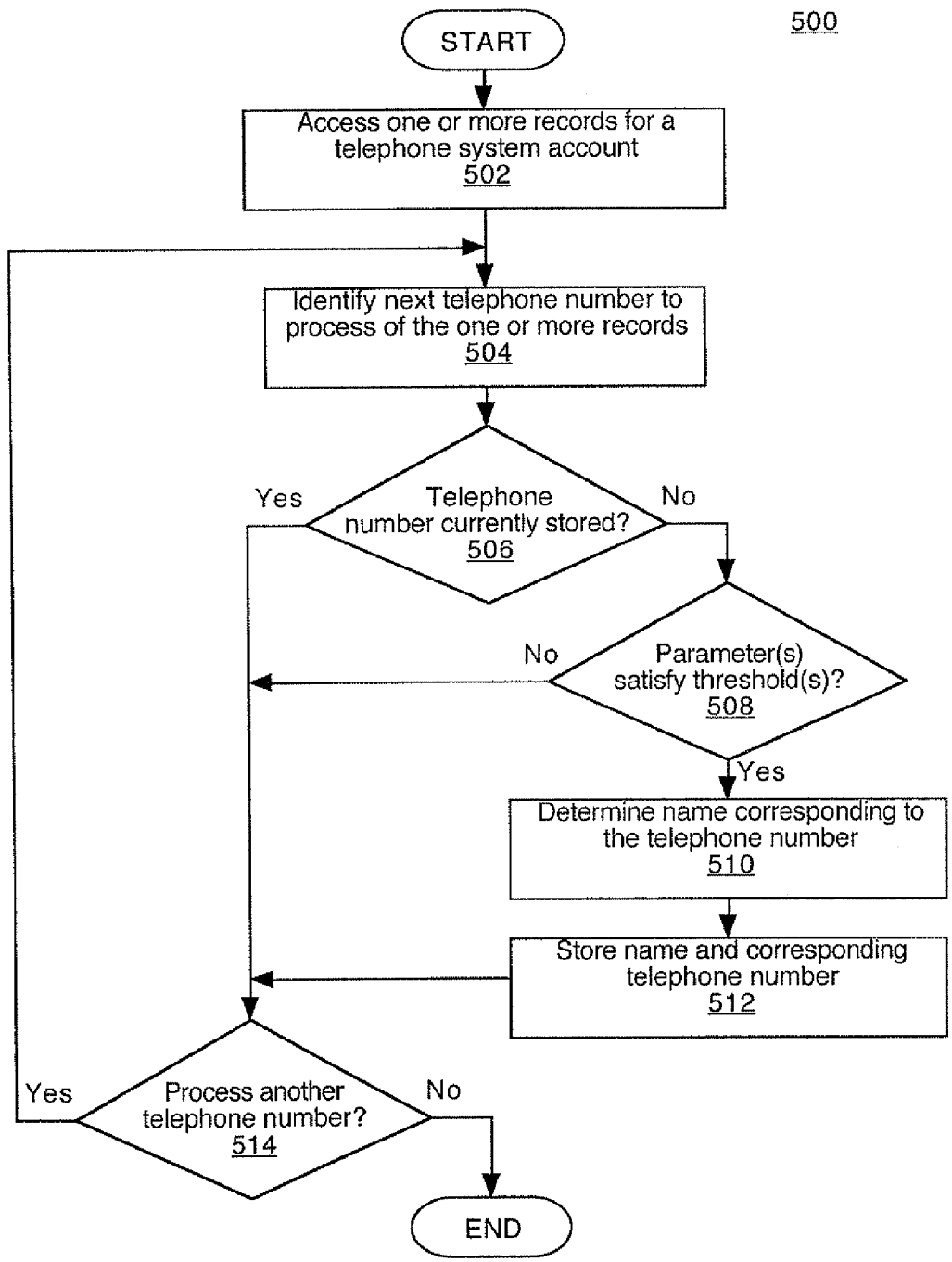

FIG. 5 shows the control flow that occurs when a call is received by a user that has a contact list that resides on the network. A call is placed to the user. The NAR detection agent 510 detects the incoming-call event and directs the call to the capture agent 520. The capture agent check to see if the network address exists in the contact list for the user 525. If the contact already exists in the contact list, the capture agent 520 releases the call and the call is directed to the user 527. If the network address (in this example, the telephone number of the calling party) does not exist in the user's contact list, the capture agent 520 accesses a caller ID database and performs a reverse look-up 528. If the caller ID search returns an identifier, such as the name of the business from which the call originated, the capture agent will populate the contact list 530 with the network address and the name. The capture agent 520 will also populate the history store 580 with the information for future use. If the caller ID search does not return a name, the capture agent will populate the history store 580 with a record associating the user's name or telephone number (network address) with the network address of the originating call.

Figure 6:
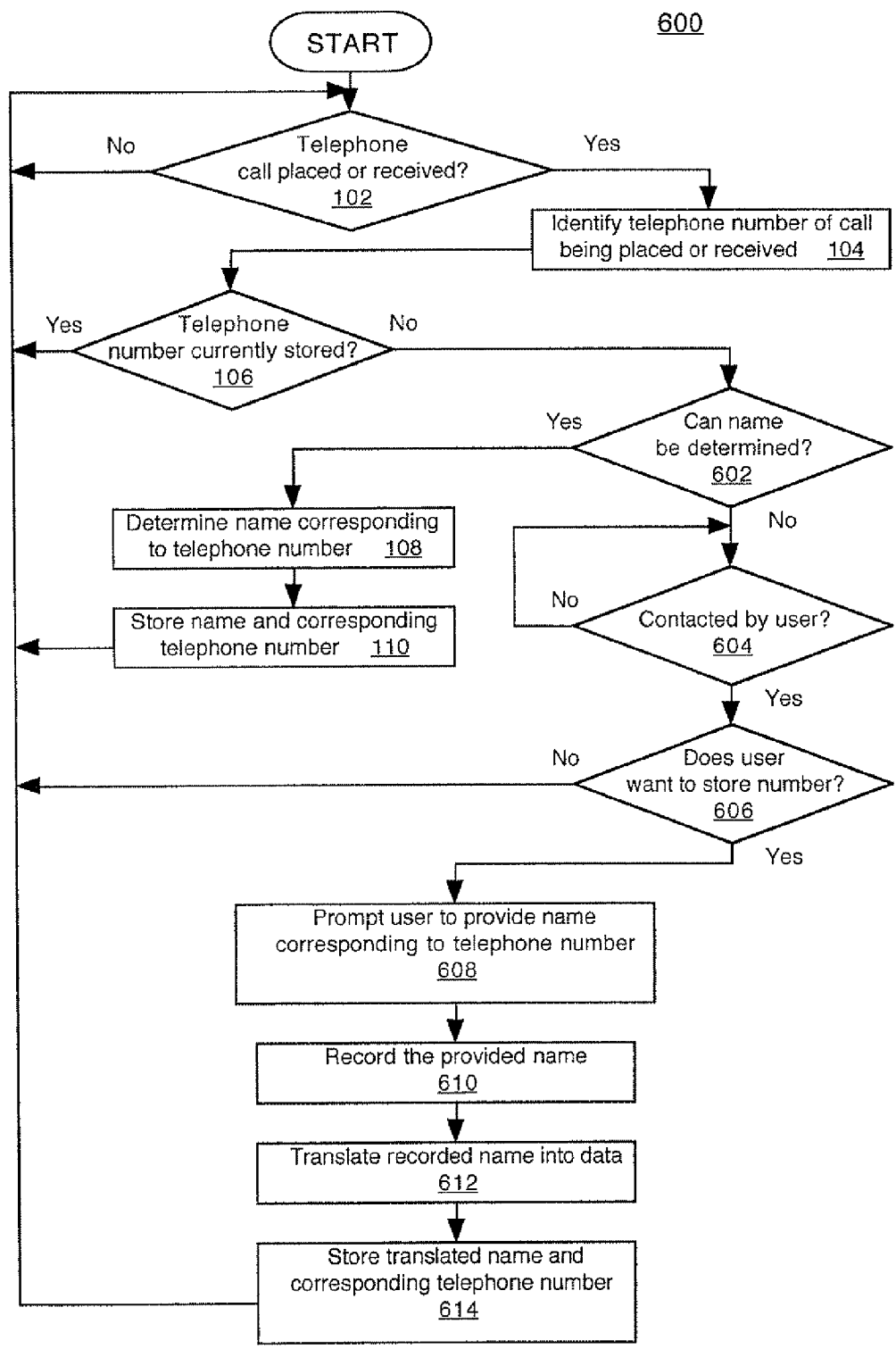

FIG. 6 shows the control flow when a user dials a directory assistance number. The user contacts a directory assistance 605 that includes a NAR detection agent 610. The NAR detection agent 610 detects the request for information from the user, either by the initialization of a speech recognition engine at the directory assistance site or through a live operator that access the information by searching a database. The call is directed to the capture agent 620. The capture agent 620 listens while the call proceeds. The capture agent 620 using a speech-to-text program obtains the requested listing information including the name associated with the listing and the telephone number. The capture agent 620 accesses the user's contact list 630 and determines whether the telephone number is already within the user's contact list 630. If the telephone number and name are already present the call completes. If the name and number are not present within the user's contact list, the capture agent adds the name and telephone number to the contact list 630.

Figure 7:
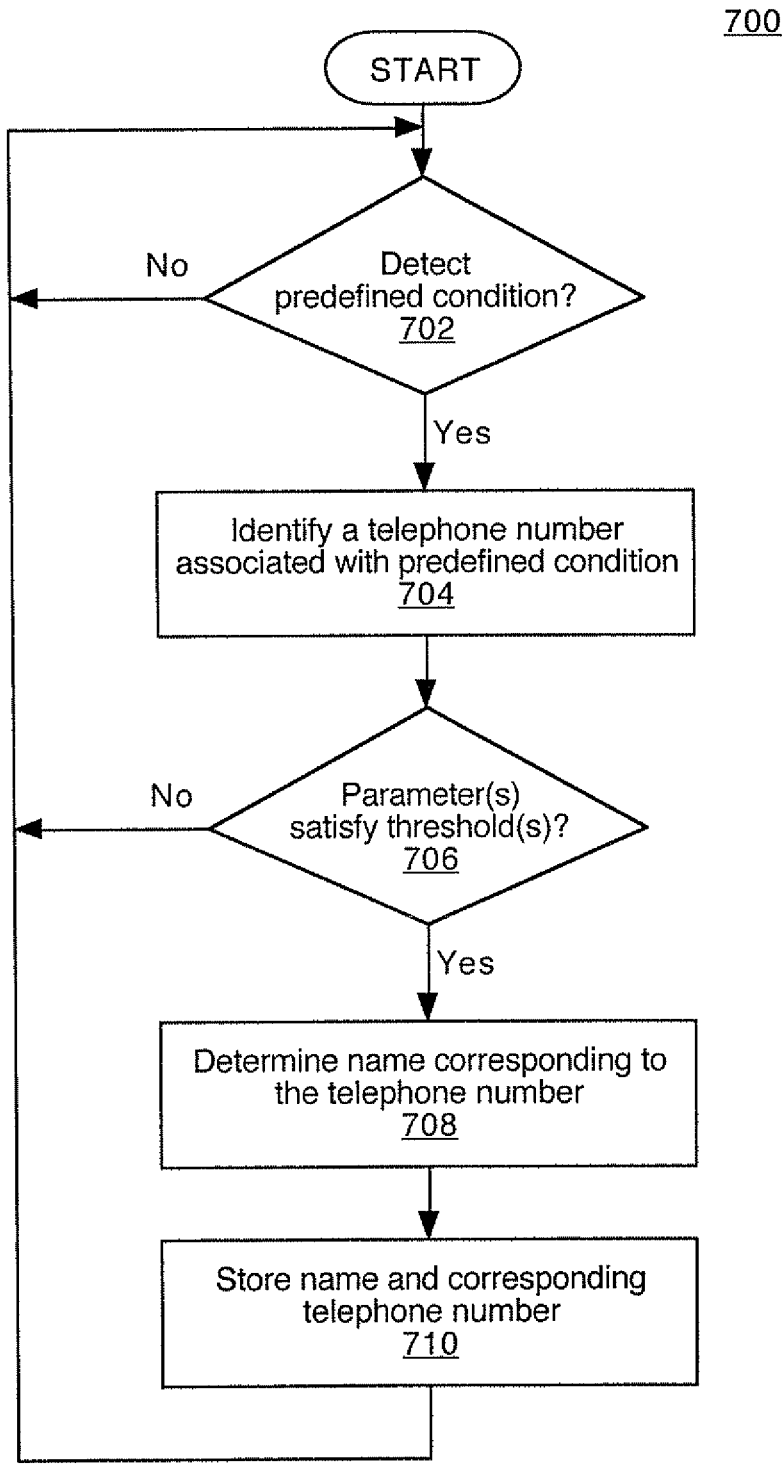

The capture agent may also mine for data even if a network event does not occur as shown in FIG. 7. For example, the capture agent 710 can access history stores 780 containing telephone billing information. The capture agent accesses billing records 785 and call logs 786 without a call occurring, so that the activity of the capture agent is "off-line." The capture agent 710 can be programmed to periodically access the records using a batch review 715 applying the business rules to the billing records 785 and call logs 786. The capture agent 710 can parse this information and retrieve telephone numbers that the user has called and can populate the user's contact list 730 after performing a caller ID reverse look-up and can access other databases to obtain information regarding a telephone number in the records or logs 780. An out-of-band message can then be sent to a user through an SMS message system 790. The SMS message system 790 creates questions regarding the adding of information to the user's address book and the SMS message system 790 would receive replies from the user. The user can accept or decline adding the new information.

Figure 8:
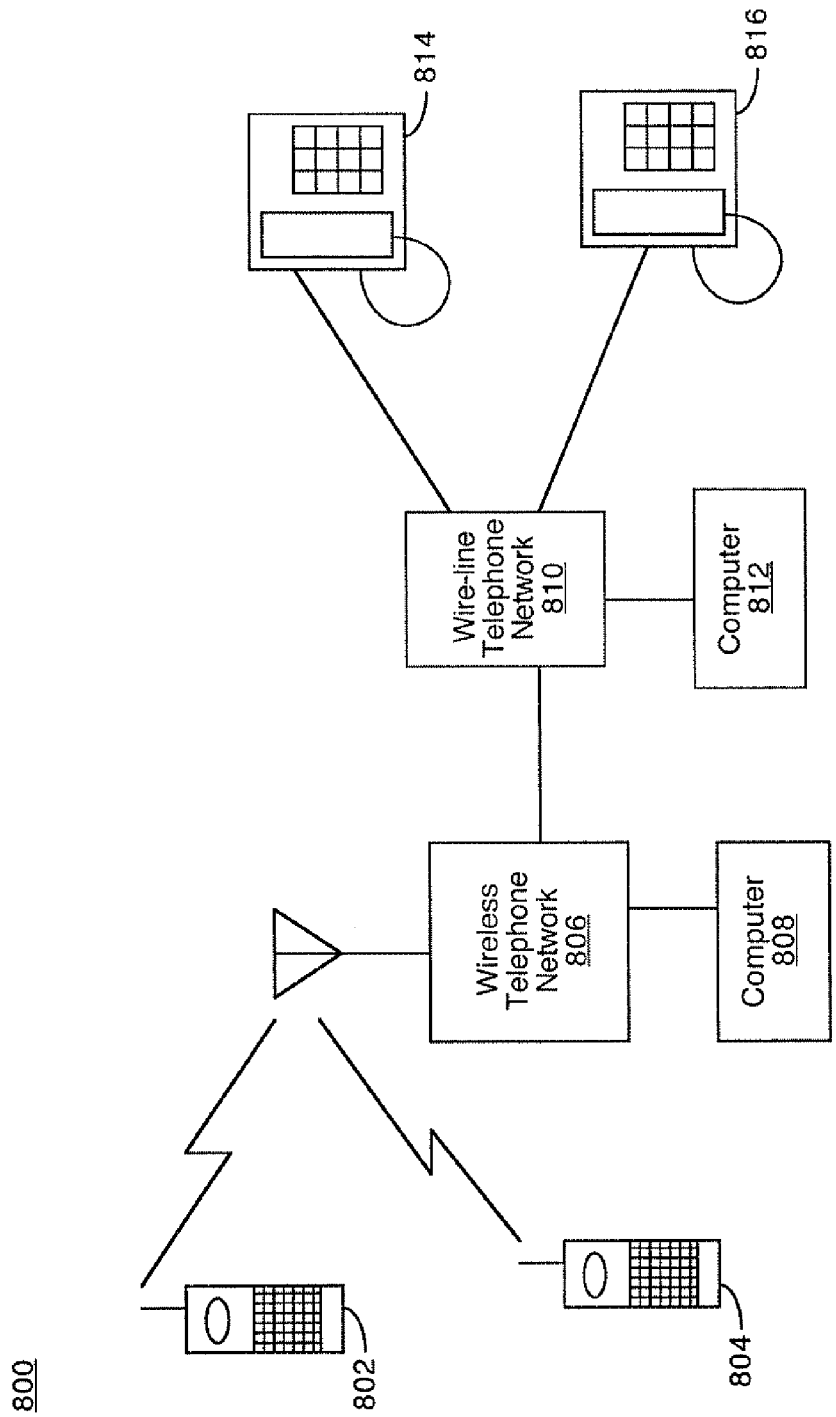

FIG. 8 shows the control flow of the system performing a reverse look-up. In a first scenario, a user receives a call from a number that does not exist in the user's contact list. The capture agent 820 will check one or more databases. Each database may have its own interface for querying. During call setup, a caller ID database as is known in the art is accessed. The caller ID information is passed to the capture agent 820. If the name associated with the telephone number of the calling party is part of the caller ID information, the capture agent 810 will access the history store 835 that contains call histories. Assuming that the name cannot be retrieved from the history store, the capture agent 820 will consult a user identity data store, such as the shared directories database or the CNAME database 821. The shared directories database 822 allows users of the system to share contact list information. A user may share their entire contact list or only a portion of their contact list. The capture agent 820 accesses the publicly available records within the shared directories database 822 sharing for the name that corresponds with the telephone number. If the name cannot be found within the shared directories database, the capture agent accesses the CNAME database 821. The CNAME database is part of the PSTN network and has an SS7 (TCAP) interface for querying.

Figure 9:
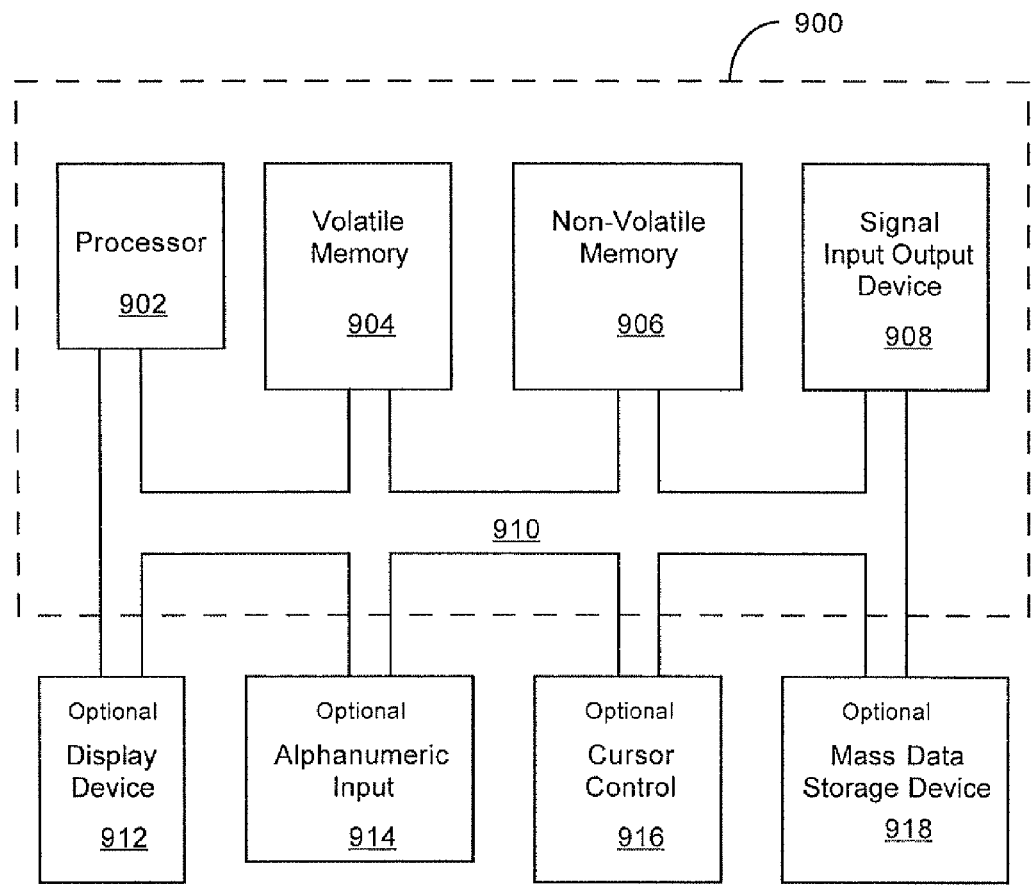

FIG. 9 shows the control flow when the business rules require prompting of the user. In this example, the user dials or receives a call (network event) and the NAR detection agent 910 senses the event and accesses the capture and prompting agent 920. The capture and prompting agent applies the rules and determines whether the user should be prompted. If upon evaluation of the business rules, the rules do not require the user to be prompted 925, call completion occurs 927. If the user should be prompted, the user is prompted 928 using an IVR server that performs text to speech and inquires whether the user desires to have the information added to the user's contact list 930.

The business rules may also be evaluated when a user listens to voice mail messages or reviews missed calls. After listening to the voice mail message, the user can be prompted to add the profile element to the user's contact list. In an e-mail embodiment, the business rules may trigger an e-mail notification to add a sent or received network address reference (e-mail address) to the user's contact list. The user can then reply back to the e-mail indicating that the user wishes/ does not wish to add the e-mail address and other associated profile elements with the e-mail address. The return address can be the IP address of the web server, which can direct the e-mail message to the capture and prompting agent. Similarly in an SMS embodiment, the an SMS message can be sent to the user requesting whether or not to add a sent or received SMS address and associated profile elements to the user's contact list. Again, the return SMS address may be the address of the web server, which can provide the message to the capture and prompting agent.

Provided next are examples of the business rules. In a first example, the frequency of sending/dialing a network address causing a network address reference event will trigger adding profile elements associated with the network address in the user's contact list. The user may send an e-mail message to Company X, four times and upon the sending of the e-mail message a fourth time the e-mail address of Company X is added as a profile element to the user's contact list. Another business rule may apply to the reverse sequence. Based upon a set number of times that a network address is received or called from, the capture and prompting module will add profile elements associated with the network address to the user's database when the threshold number is met or exceeded. A user may receive e-mail messages from his friend Bob, three times. The business rule will be satisfied when the third e-mail message is received and will automatically add Bob to the user's contact list and any profile information that the capture and prompting agent can find in the user identity data stores. Business rules can be created that combine the above two examples. For instance, the rules may require five network events from/to the same network address to occur before adding profile elements regarding the network address to the user's contact list. The user may call party A three times and receive two calls from party A, and therefore, the business rule would be met and the user's contact list would be populated with one or more of party A's profile elements.

The system may be configured to identify when different network addresses belong to the same party. The capture and prompting agent may use a reverse e-mail look-up to identify that party X is associated with a first e-mail address and on a separate occasion, the capture and prompting agent may use a reverse e-mail look-up to identify that party X is associated with a second e-mail address. Thus, business rules can be defined based upon the identity of the party associated with the network address. For example, a user's contact list may be populated upon three network address reference events from the same party. The user may receive a phone call, an e-mail and an SMS message from the same party and the business rule would be met.

The present invention has been described with the reference to the above exemplary embodiments. One skilled in the art would understand that the present invention may also be successfully implemented if modified. Accordingly, various modifications and changes may be made to the embodiments without departing from the broadest spirit and scope of the present invention as set forth in the claims that follow. The specification and drawings, accordingly, should be regarded in an illustrative rather than restrictive sense.

What is claimed is:

1. A method for updating an address book for a user, the method comprising:
   maintaining a data store that stores telephone billing information that includes call logs or billing records for multiple users;
   maintaining a business rules database that stores business rules that are associated with certain users and that are modifiable by an associated user;
   automatically parsing the data store on a periodic basis to identify and retrieve telephone numbers referenced in the call logs or billing records that are associated with the user to which a business rule associated with the user is to be applied to evaluate for incorporation into the address book of the user; and
   when the evaluated business rule is satisfied,
      performing a caller ID reverse lookup to obtain information regarding an identified telephone number;
      sending an inquiry to the user as to whether the obtained information should be added to the address book; and
      when the user indicates that the obtained information should be added to the address book, adding the obtained information to the address book.

2. The method according to claim 1, wherein, the inquiry is provided to the user over a communication channel different from the telephone call.

3. A system for updating an address book for a user, the system comprising:
   a data store that stores telephone billing information that includes call logs or billing records for multiple users;
   business rules database that stores business rules that are associated with certain users and that are modifiable by an associated user; and
   a capture agent that
      automatically parses the data store on a periodic basis to identify and retrieve telephone numbers referenced in the call logs or billing records that are associated with the user to which a business rule associated with the user is to be applied to evaluate for incorporation into the address book of the user; and when the evaluated business rule is satisfied, performs a caller ID reverse lookup to obtain information regarding an identified telephone number;

sends an inquiry to the user as to whether the obtained information should be added to the address book; and when the user indicates that the obtained information should be added to the address book, adds the obtained information to the address book.

4. The system of claim 3 wherein the inquiry is provided to the user over a communication channel different from a telephone call.

5. A computer-readable storage device storing executable instructions for updating an address book for a user, the executable instructions comprising instructions that:

access a data store that stores telephone billing information that includes call logs or billing records for multiple users;

access a rules database that stores business rules that are associated with certain users and that are modifiable by an associated user;

automatically parse the data store on a periodic basis to identify and retrieve telephone numbers referenced in the call logs or billing records that are associated with the user to which a business rule associated with the user is to be applied to evaluate for incorporation into the address book of the user; and when the evaluated business rule is satisfied, perform a caller ID reverse lookup to obtain information regarding an identified telephone number;

send an inquiry to the user as to whether the obtained information should be added to the address book; and when the user indicates that the obtained information should be added to the address book, add the obtained information to the address book.

6. The computer-readable storage device of claim 5 wherein the inquiry is provided to the user over a communication channel different from a telephone call.

* * * * *